Oct. 29, 1940.  W. H. EDMUNDS  2,219,300

PHOTOGRAPHIC CAMERA AND EXPOSURE METER

Filed May 1, 1939  2 Sheets-Sheet 1

Inventor:
William H. Edmunds
By Martin E. Anderson
Attorney

Oct. 29, 1940.   W. H. EDMUNDS   2,219,300
PHOTOGRAPHIC CAMERA AND EXPOSURE METER
Filed May 1, 1939   2 Sheets—Sheet 2
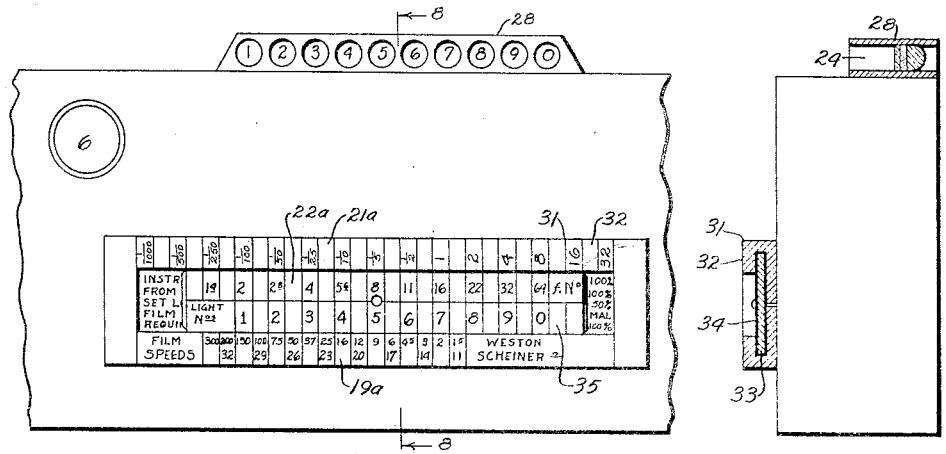
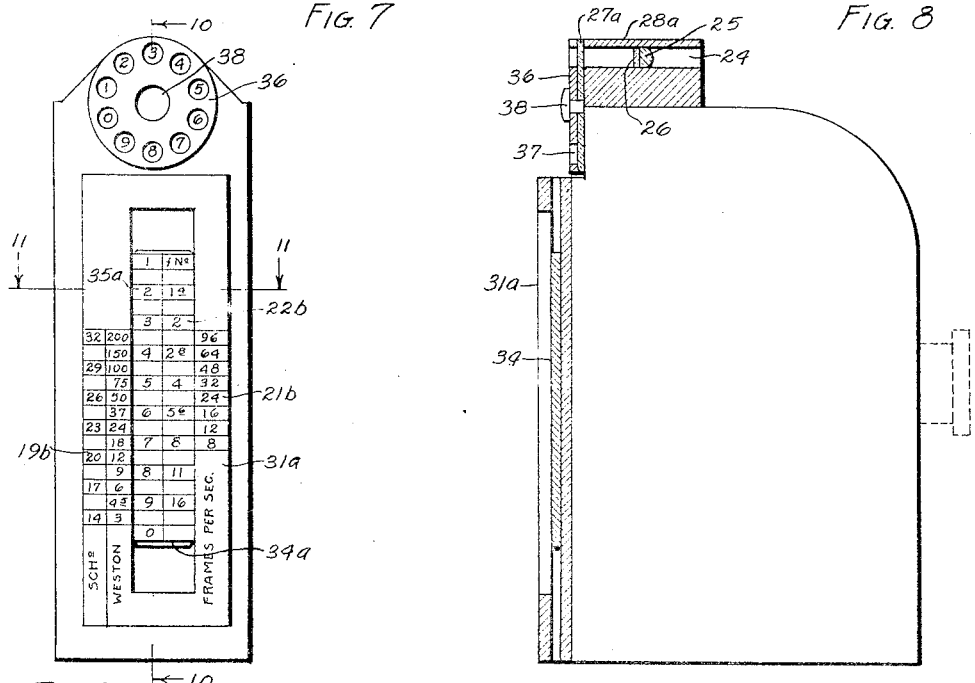
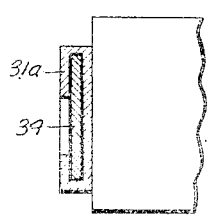
Inventor:
William H. Edmunds
By Martin E. Anderson
Attorney Patented Oct. 29, 1940

2,219,300

UNITED STATES PATENT OFFICE 2,219,300

PHOTOGRAPHIC CAMERA AND EXPOSURE METER

William H. Edmunds, Denver, Colo.

Application May 1, 1939, Serial No. 270,971

3 Claims. (Cl. 88—23)

This invention relates to improvements in photographic cameras and exposure meters.

In order to get the best results from a camera it is essential that the light reflecting properties of the object to be photographed shall first be determined by a proper instrument and the speed and iris diaphragm opening be adjusted accordingly.

For the purpose of assisting in getting the proper adjustment of cameras, photometers of different kinds have been invented and extensively used. In a great majority of cases, such photometers are separate instruments that can be carried in the pocket or in a suitable case and employed for obtaining a reading corresponding to the light reflecting properties of the object to be photographed.

Photometers of the kind referred to do not always give the proper readings for the reason that they are, as a rule, not held in a position corresponding to the position of the camera lens and usually include ether a greater or lesser area than that to be photographed and the readings are therefore influenced by light conditions outside of the object or area which will affect the photographic plate.

It is the object of this invention to produce a photographic camera having three optical axes, one of which is the main axis of the photographic lens, the other being the axis of the view finder and the third the axis of the photometer. The camera with its three axes is so constructed that the optical axes always bear a predetermined position relative to each other.

Another object of this invention is to produce an extinction photometer that can be readily incorporated into the construction of an ordinary camera and which can be readily operated to obtain accurate results.

A still further object of the invention is to produce a photometer of such construction that it can be readily built into or applied to very small cameras such as are now extensively used.

The above and other objects that may become apparent as this description proceeds are attained by means of a construction and an arrangement of parts that will now be described in detail, and for this purpose reference will be had to the accompanying drawings, in which the invention has been illustrated, and in which:

Figure 7 is a rear elevation of the camera showing a photometer similar to that illustrated in Figure 4, the circular construction having been replaced with a longitudinal extending device having two relatively movable parts;

Figure 8 is a section taken on line 8—8, Figure 7;

Figure 9 is a rear elevation of a slightly modified form of camera and photometer which are adapted more particularly for the taking of moving pictures;

Figure 10 is a section taken on line 10—10, Figure 9; and

Figure 11 is a section taken on line 11—11, Figure 9.

Figure 1:
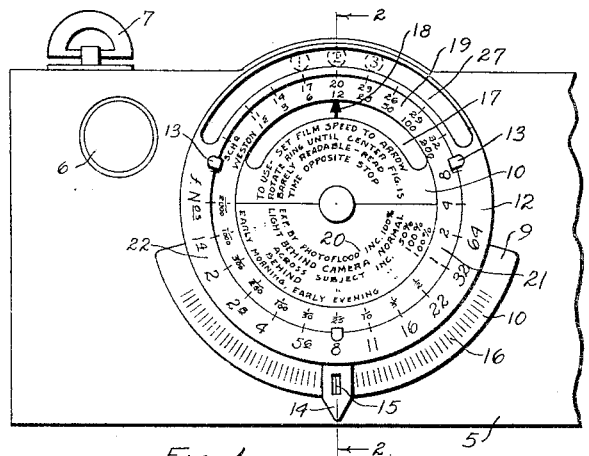
Figure 1 shows a rear elevation of a camera provided with my improved extinction photometer.

In the drawings reference numeral 5 designates in a general way, a camera, reference numeral 6 designates the view finder and reference numeral 7 the film wind key. The camera is provided with a photographic lens which has been indicated by dotted lines and designated by reference numeral 8. Since this invention has no reference to the specific construction of the camera except in so far as it combines with the camera having a photographic lens and a view finder, a photometer having its optical axis parallel with the optical axes of the camera and rigidly connected therewith so as to maintain a predetermined relation of the several optical axes, the camera has merely been diagrammatically indicated. The photometer consists of a base 9 which is secured to or formed integral with the camera body 5. A disk 10 is rotatably connected with the base 9 by means of a pivot 11 and rotatably secured to this disk is a ring 12 which is held in place by means of lugs 13 that extend outwardly from the rotatable disk and have their ends bent so as to project over the outer surface of ring 12. The disk 10 is provided with a downwardly extending pointer 14 having a depressed portion 15 and base 9 is provided with an arcuate row of parallel projections 16 between which the projecting portion of pointer 14 extends and which serves to hold the disk 10 in adjusted position relative to the base for a purpose which will presently appear. Disk 10 is provided with an arcuate opening 17 that is positioned diametrically opposite from the pointer 14 and extends for less than 180 degrees. This opening is positioned symmetrically with respect to a diameter passing through the center of pointer 14. An indicator or arrow 18 is painted on the surface of base 9 so as to be visible through opening 17. Between the outer edge of opening 17 and the inner edge of ring 12 is a scale 19 having two concentric rows of figures, one of which has been designated by SCH, which is an abbreviation for the name "Scheiner," and indicates a system of photographic speed rating. The other row of figures is designated by the name "Weston" which indicates another system of film speed rating. This scale has been designated by reference numeral 19 and the numbers indicate the emulsion speed ratings of the film according to the two systems mentioned. The surface of the disk 10 above a horizontal diameter and below the arcuate opening 17 contains directions for using the photometer and a zone beneath this horizontal diameter contains a scale or table 20 which explains different modifications of the settings to conform to indicated light conditions. In the same zone as that in which scale 19 is located and extending around the movable disk below the horizontal axis is a scale 21 which has figures indicating shutter speed. These figures indicate speeds in seconds and fractions of a second. Ring 12 is provided with a scale 22 that designates "F" numbers or the openings in the iris diaphragm.

Extending forwardly from the base is a solid member of suitable material, which has been designated by reference numeral 23 and this has been shown as containing three parallel openings 24. The base 9 is also provided with corresponding openings that are in axial alignment with openings 24. Each opening has positioned therein a condenser lens 25 and a transparent disk 26 on whose surface is painted a number. These numbers are shown dotted in Figure 1 as 1, 2 and 3. Attached to the inner surface of ring 12 is a photometric screen or wedge 27 that varies in light transmitting properties from one end to the other, one end being almost transparent and the other being practically opaque. By rotating ring 12 any portion of the photometric wedge can be brought into position before the openings 24 and the parts are so adjusted that Figure 1 is plainly visible, Figure 3 is invisible and Figure 2 barely visible. When the parts are adjusted to get this result, the photometer is in proper position to obtain the desired reading.

Since the time of exposure depends to a great extent on the speed of the emulsion, the first step is to adjust the movable disk with respect to the base 9 so as to bring the arrow or indicator 18 into alignment with the number on scale 19 which designates the emulsion speed of the plate or film employed. This setting does not have to be changed so long as the same emulsion speed is used. After the movable disk 10 and base 9 have been adjusted for emulsion speed, the photographer positions his camera so as to point towards the object to be photographed and views the object through the center opening 24. He now rotates the ring 12 so as to bring portions of the photographic wedge of increasing opaqueness into register with these openings and when the image is extinct in opening 3 and barely visible in opening 2, the proper adjustment has been effected as above explained. The iris diaphragm opening and the speed can now be determined from scales 21 and 22 and the proper selection made. If the object is a moving one and the light is good, a high speed with a large "F" opening may be selected, whereas if a greater definition is desired at lower speed other combinations may be selected. For examples with "F" openings 22 a speed of one-half second will be required with the setting shown in Figure 1. With such length of exposure the camera must be supported on a tripod.

The length and diameter of openings 24 are so selected that when image is viewed through these openings, the area visible is substantially the same as that which will be covered by the photographic lens, or by the views finder and in this way the photographer is assured that the light he is measuring is that which will affect the photographic plate or film when the exposure is made.

In the embodiment described, the photometric screen or wedge must be moved in front of the openings in order to get the light values, and is itself visible through the segmental opening in ring 12.

Figure 4:
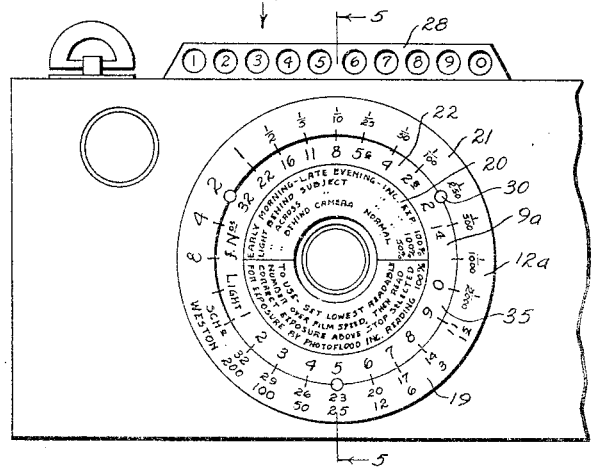
Figure 4 is a rear elevation similar to that shown in Figure 1, and shows a slightly different form of photometer.
Figure 5:
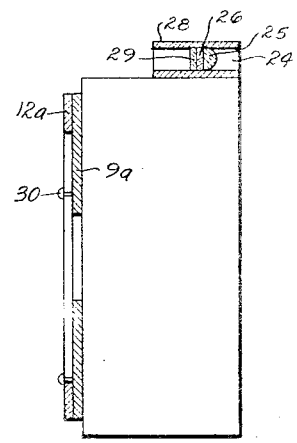
Figure 5 is a section taken on line 5—5, Figure 4.
Figure 6:
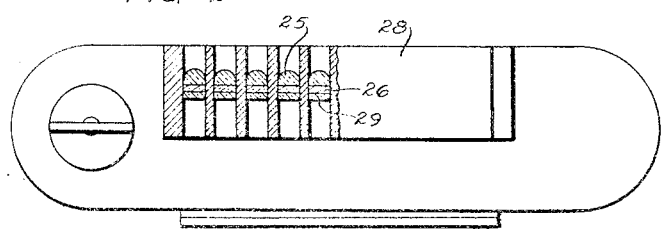
Figure 6 is a top plane view of the camera looking in the direction of arrow 6, Figure 4, parts being broken away and shown in section to better disclose the construction.

In Figures 4, 5 and 6 a slightly modified form of construction has been shown. In this construction a separate piece 28 has been attached to the top of the camera and provided with ten spaced parallel openings 24. In each opening the condenser lens 25 is located and adjacent the rear surface of this lens is a transparent disk 26 containing a number. Positioned to the rear of disk 26 is a photometric screen disk 29 which varies in light transmitting properties from hole to hole, the disk in opening 1 being substantially transparent while that in opening "0" is substantially opaque, the difference in light transmitting properties preferably doubling or halving from one opening to the other. When an object is viewed for the purpose of measuring its light reflecting properties, it will be found that the image becomes entirely extinct at one point and when viewed through the opening adjacent it can be faintly seen, while through the next adjacent opening it can be plainly seen. The reading is then selected as corresponding to the number of the opening through which the image can be faintly seen and in the example illustrated in Figure 5, we will assume that the number representing the light is "6". If the speed of the emulsion as represented by scale 19 is taken as 20 or 12, then the ring 12a is rotated until numbers 20 and 12 register with number 6 on the base 9a. The combination of shutter speeds and lens openings can now be selected from scales 21 and 22 in the manner above described. The base of the photometer shown in Figures 4 and 5 is also provided with a scale of modification 20 and directions similar to those shown in Figure 1. The ring 12a is held in place by means of headed pins 30 or some other equivalent means.

Figure 2:
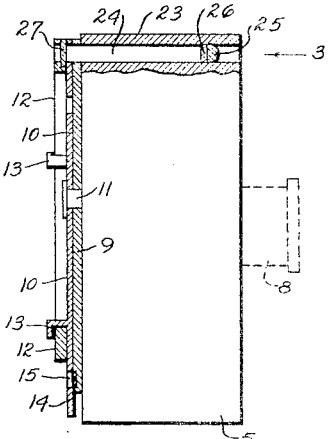
Figure 2 is a section taken on line 2—2, Figure 1.
Figure 3:
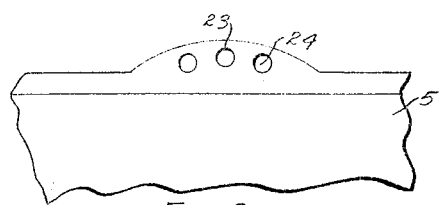
Figure 3 is a front elevation showing a portion of the camera, looking in the direction of arrow 3, Figure 2.

It will be seen that the photometer shown in Figures 4 and 5 is of a slightly simpler construction than that shown in Figures 1 and 2, but the operation is substantially identical. Instead of the elongated photometric screen 27 employed in the first embodiment separate screens 29 are positioned in each sight opening.

At present many cameras are constructed of very small size and some of them are so small that circular scales like those shown in Figures 1 and 4 cannot be accommodated of sufficient size to permit them to be readily read and for such small cameras the circular arrangement can be replaced by a straight scale like that shown in Figures 7 and 8. This scale consists of an elongated member 31 having inwardly turned flanges which form grooves 33 in which a slide 34 is movable. One edge of member 31 carries a scale 21a which indicates shutter speed and the other edge carries a scale 19a that indicates emulsion speeds as above described. The movable slide has a scale 22a that represents iris diaphragm openings in "F" numbers and another scale 35 that represents the light intensities corresponding to the numbers in openings 24. After the value of the light has been obtained, the number corresponding is adjusted so as to register with the proper number on the emulsion or film speed scale 19a, after which the shutter speed and "F" openings are determined from scales 21a and 22a.

In Figures 9, 10 and 11 a slightly modified arrangement has been shown. In this modification the member 28a is provided with three openings 24, each of which has a condenser 25 in front of which is positioned a disk 26. The photometric wedge has been designated by reference numeral 27a and is circular. This wedge is secured to the rear surface of a disk 36 that has ten openings 37 and is rotatable about a pivot 38. The photometric wedge or screen varies in light transmitting properties from opening to opening as has already been explained. The scales are arranged vertically and consist of an outer member 31a and a slide 34a. The construction can be quite similar to that shown in Figures 7 and 8.

Since cameras of this type are nearly always used for moving pictures, a scale 21b representing frames exposed per second is substituted for scale 21a that represents shutter speed, the slide carries a scale 22b that represents the iris diaphragm openings or the "F" numbers and a scale 35a that indicates the light intensity. It also has a scale 19b that indicates the emulsion speeds. After the light intensity has been measured by means of the photometric wedge or screen and the proper number determined, this number is adjusted so as to register with the number representing the emulsion speed of the film used after which the "F" number is determined by comparing the frames per second with the numbers in scale 22b.

It will be observed from the above description and from the drawings that in this embodiment of the invention, the member containing sight openings is rigidly secured to the camera so as to maintain a parallel arrangement with respect to the optical axis of the camera. With this arrangement, the light measured will always correspond to that which is reflected from the object or area to be photographed and greater accuracy in determining the light values can therefore be obtained with this arrangement than if the photometer were separated from the camera and held in the operator's hand while the light intensity is measured.

It will be observed that since the scales are located in planes substantially perpendicular to the optical axes of the photometer or light integrator, both can be held at such a distance from the eye that both may be read without changing the focal distance of the eye, and this facilitates the operation.

The condensers 25 serve to uniformly integrate the light reflected from the object and their position in the openings is such that they are effected only by the light coming from the object or the area embraced in the area covered by the photographic lens.

In ordinary extinction meters where the identification figures are on plain flat glass, the light reflecting properties of the object are not integrated and if the object happens to have a small, bright area, the eye will contrast the identifying figure against this one bright area and disregard the darker areas. When a condenser lens is used this integrates the entire subject into one light spot that is an average of all of the light values of the subject. A condenser lens of the proper size and curvature to include only the field of vision of the camera lens and view finder measures and integrates light from the area to be photographed only to the exclusion of other adjacent light reflecting surfaces.

Having described the invention what is claimed as new is:

1. An extinction type light integrator and exposure meter for incorporation into a camera having a photographic lens and a view finder, comprising a solid member having a plurality of parallel sight openings, the axes of said openings being parallel with the optical axis of the camera and their length and diameter being so proportioned that the area visible therethrough is substantially identical with that covered by the lens and the view finder, a photometric screen member positioned across the openings, the light transmitting properties of said screen being different for each opening, a base of sheet material carried by the camera, a scale member of sheet material movably connected with the base, the base and movable member having two cooperating scales, one having graduations designating light values as determined from the photometer and the other having graduations indicating emulsion speeds, the base and movable member having also two other cooperating scales, one designating diaphragm openings and the other shutter speeds, the relationship of the four scales being such that when the graduation of the light intensity scale is so positioned that it registers with that part of the cooperating scale indicating emulsion speeds, the shutter speeds and diaphragm openings corresponding thereto can be determined from the other scales.

2. A photometer device and exposure meter for use with a camera, comprising, in combination, a flat base of sheet material, a disk pivotally attached to the base, said disk having an arcuate opening concentric with the pivot, the base having an index pointer visible through the opening, the outer surface of the movable member having a scale adjacent one edge of the arcuate opening whose graduations designate emulsion speeds, means for adjusting the base and the movable member so that the index will be in alignment with that part of the scale which designates the emulsion speed, a solid member extending laterally from the base, near its outer edge, said member having a plurality of parallel sight openings whose axes are perpendicular to the base, the movable member having an arcuate slot that registers with the sight openings, a ring rotatably attached to the movable member, the ring having an arcuate opening coextensive with the last named opening in the movable member, and a photometric screen of varying density extending along the arcuate slot in the ring, various portions of said screen being movable into position across the sight openings when the ring is rotated relative to the movable member, the sight openings having transparent disks provided with numbers that can be extinguished by moving the screen, the base and the ring having cooperating scales, one designating shutter speeds and the other the corresponding diaphragm openings, the last mentioned scales being brought into operative position by rotating the ring relative to the base and movable member until the extinction photometer is properly adjusted.

3. A photometric device and exposure meter for use with cameras having a photographic lens and a view finder, comprising a substantially circular base for attachment to a camera, the edge of the base having an opening, a solid body member having an axially elongated sight opening in register with the opening in the base, a transparent member positioned in the opening and having a numeral printed thereon, which is visible when light passes through the member, a disk pivotally attached to the base, the disk having an elongated arcuate slot in register with the opening in the base, detent means for holding the base and movable member in adjusted position, the movable member having another arcuate opening positioned between the first opening and the pivot, the base having an indicator visible through last named opening, the movable member having a scale extending along one side of the last named opening which is graduated to indicate emulsion speeds, a ring pivotally connected with the movable member, the ring having an arcuate opening positioned to register with the first mentioned opening in the movable member, the ring having a photometric screen positioned across the elongated arcuate opening, said screen varying in light transmitting properties from one end to the other whereby when the ring and movable members are rotated relative to the base the light transmitted through the sight opening can be decreased to extinction, the movable member and the ring having two cooperating scales, one representing iris diaphragm openings and the other shutter speeds corresponding to the light conditions prevailing as determined by the position of the photometric screen relative to the sight opening.

WILLIAM H. EDMUNDS.